United States Patent
Song

(10) Patent No.: US 9,221,516 B1
(45) Date of Patent: Dec. 29, 2015

(54) HUB MOTOR STRUCTURE

(71) Applicant: MANDO CORPORATION, Pyeongtaek-si (KR)

(72) Inventor: Joon-Kyu Song, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/591,935

(22) Filed: Jan. 8, 2015

(30) Foreign Application Priority Data

Dec. 18, 2014 (KR) .................. 10-2014-0182938

(51) Int. Cl.
*F16H 3/72* (2006.01)
*B62M 6/60* (2010.01)
*B62M 6/45* (2010.01)
*B62M 6/50* (2010.01)
*F16H 9/26* (2006.01)

(52) U.S. Cl.
CPC . *B62M 6/60* (2013.01); *B62M 6/45* (2013.01); *B62M 6/50* (2013.01); *F16H 9/26* (2013.01)

(58) Field of Classification Search
CPC ............ B62M 6/60; B62M 6/50; B62M 6/45; B62M 6/65; F16H 9/26
See application file for complete search history.

(56) References Cited

U.S. PATENT DOCUMENTS

| 6,418,797 | B1 * | 7/2002 | Ambrosina | B62M 6/40 73/862.29 |
|---|---|---|---|---|
| 8,348,798 | B2 * | 1/2013 | Lo | B60K 1/04 180/65.51 |
| 8,419,580 | B2 * | 4/2013 | Lo | A61G 5/04 180/65.51 |
| 8,795,120 | B2 * | 8/2014 | Kim | F16H 1/28 180/65.51 |
| 9,114,851 | B2 * | 8/2015 | Schneider | B62M 6/60 |
| 9,139,253 | B2 * | 9/2015 | Song | B62M 6/65 |
| 2005/0176542 | A1 * | 8/2005 | Lo | B62M 7/12 475/5 |
| 2005/0264112 | A1 * | 12/2005 | Tanaka | B60B 27/02 310/75 C |
| 2007/0187952 | A1 * | 8/2007 | Perlo | B60L 8/00 290/1 R |
| 2011/0168511 | A1 * | 7/2011 | Yamamoto | B62M 6/45 192/45.006 |
| 2011/0259658 | A1 * | 10/2011 | Huang | B60K 1/04 180/65.51 |
| 2012/0083375 | A1 * | 4/2012 | Lo | B60K 1/04 475/149 |
| 2015/0191215 | A1 * | 7/2015 | Kawakami | B62M 6/55 477/4 |

* cited by examiner

*Primary Examiner* — David J Hlavka
(74) *Attorney, Agent, or Firm* — Ladas & Parry, LLP

(57) ABSTRACT

Disclosed is hub motor structure installed on a bicycle, the hub motor structure including a hollow shaft installed on a frame of the bicycle, a housing rotatably installed on the hollow shaft, and connected to a wheel at an outer circumferential surface thereof through spokes, a cover rotatably installed on the hollow shaft while installed on the housing, and on which a driven sprocket connected to a chain is provided to receive a pedaling force, a motor disposed in the housing and generating a rotary force to drive the wheel, a continuous variable transmission (CVT) disposed in the housing to selectively shift power supplied from the motor, a power transmission unit configured to transmit a rotary force of the motor to the CVT, and a gear unit configured to transmit a rotary force output from the CVT to the housing.

12 Claims, 6 Drawing Sheets

HUB MOTOR STRUCTURE

CROSS-REFERENCE TO RELATED APPLICATION

This application claims the benefit of Korean Patent Application No. 10-2014-0182938 filed on Dec. 18, 2014, with the Korean Intellectual Property Office, the disclosure of which is incorporated in its entirety herein by reference.

BACKGROUND

1. Field

Embodiments of the present disclosure relate to a hub motor structure, and more particularly, to a hub motor structure of providing a thrust by transferring a rotary force of a motor.

2. Description of the Related Art

In general, a bicycle represents a vehicle having two wheels that are impelled by a stepping force of a rider, in which wheels (a front wheel and a rear wheel) are connected to each other by a pipe, and through the connecting of a chain, a pedal and a chain sprocket, the pedaling of a rider is transferred to the rear wheel, and thus a thrust of the bicycle is generated.

In addition, the bicycle is provided with a transmission having a plurality of sprockets configured to selectively change connection with respect to a chain such that speed change is performed.

Such a general bicycle achieves travelling by obtaining a thrust only from a user's stepping force, requiring a great amount of power of a user in riding a long distance or ascending an upward slope. Accordingly, in the recent years, there is increasing development of an electric bicycle having an electromotive motor that provides a rear wheel with a power to automatically generate a thrust.

In particular, a motor structure of providing a bicycle with power includes a motor separately installed on the bicycle, a decelerator to reduce a rotary power of the motor, and a power transmission unit, and further includes a battery to supply power source to the motor, a battery management system, and an engine control unit (ECU) to control electronic components, such as the motor.

However, since a space for installing a motor structure on a bicycle is limited, there is an inconvenience in assembling compartments of the motor structure. That is, a motor, a decelerator and an ECU are installed on a pedal or a rear wheel, a battery is installed on a frame of the bicycle, and these electronic components are connected with wiring, so that a complicated structure is caused, and in this case, the wiring may be damaged. In addition, such an installation increases the volume of the motor structure, thereby lowering the utilization of the installation space and aesthetic quality of the bicycle.

SUMMARY

Therefore, it is an aspect of the present disclosure to provide a hub motor structure in which a motor and a battery are integrally formed with each other inside a housing so that the wiring is simplified, and the volume of the hub motor structure is reduced and thus the mounting efficiency of the hub motor structure is enhanced.

It is another aspect of the present disclosure to provide a hub motor structure in which a continuously variable transmission (CVT) is included in a housing, and an additional transmission is not installed, thereby simplifying the structure of the hub motor structure.

In accordance with an aspect of the present disclosure, a hub motor structure installed on a bicycle includes: a hollow shaft, a housing, a cover, a motor, a continuous variable transmission (CVT), a power transmission unit and a gear unit.

The hollow shaft may be installed on a frame of the bicycle. The housing may be rotatably installed on the hollow shaft, and connected to a wheel at an outer circumferential surface thereof through spokes. The cover may be rotatably installed on the hollow shaft while installed on the housing, and on which a driven sprocket connected to a chain is provided to receive a pedaling force. The motor may be disposed in the housing and generating a rotary force to drive the wheel. The continuous variable transmission (CVT) may be disposed in the housing to selectively shift power supplied from the motor. The power transmission unit may be configured to transmit a rotary force of the motor to the CVT. The gear unit may be configured to transmit a rotary force output from the CVT to the housing.

The CVT may have a speed-changing lever to adjust a gear ratio, and the speed-changing lever may be disposed in the hollow shaft while inserted into an elongation hole formed lengthwise along the hollow shaft so as to be movable in a lengthwise direction of the elongation hole.

The speed-changing lever may have one end connected to an operating wire configured to move the speed-changing lever, and the other end connected to an elastic member providing the speed-changing lever with an elastic force.

The power transmission unit may include a driving gear installed on a rotating shaft of the motor, a driven gear installed on an input shaft of the CVT which is disposed in parallel to the rotating shaft, and a timing belt connecting the driving gear to the driven gear.

An one-way clutch may be installed between the rotating shaft of the motor and the driving gear to transfer the rotary force of the motor only in one direction.

The gear unit may include an output gear and a spur gear. The output gear may be installed on an output shaft of the CVT. The spur gear may be installed on the housing while meshed with the output gear. The housing may be provided to be rotated together with the spur gear.

A fixing panel fixed to the hollow shaft may be installed inside the housing, and the motor and the CVT may be installed on the fixing panel.

The housing may accommodate a battery pack electrically connected to the motor and an engine control unit (ECU) for electric connection and control with respect to the motor, the battery packet and electronic components.

A torque sensor may be installed on the hollow shaft to sense a pedal torque.

The housing may include: a first body rotatably installed on the hollow shaft;

a second body rotatably installed on the hollow shaft while spaced apart from the first body by a predetermined interval, and allowing the cover to be installed thereon; a ring plate interposed between the first body and the second body; and a fastening member configured to couple the first body to the second body by passing through the first body and the second body.

The first body and the second body may each have spoke holes allowing spokes to be radially coupled along the outer circumferential surface, and a bolt installation hole into which a bolt of the fastening member may be inserted.

The ring plate may include plastic.

As is apparent from the above, the hub motor structure according to embodiments of the present disclosure has a transmission unit and a battery located together with a motor inside a housing, thereby providing a compact structure while simplifying the wiring structure.

In addition, the hub motor structure is installed on the bicycle through a simplified structure, thereby improving the utilization of the installation space and the mounting efficiency of the hub motor structure.

In addition, the housing is assembled by using a plastic pipe, so that wireless communication control can be performed, for example, Bluetooth.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
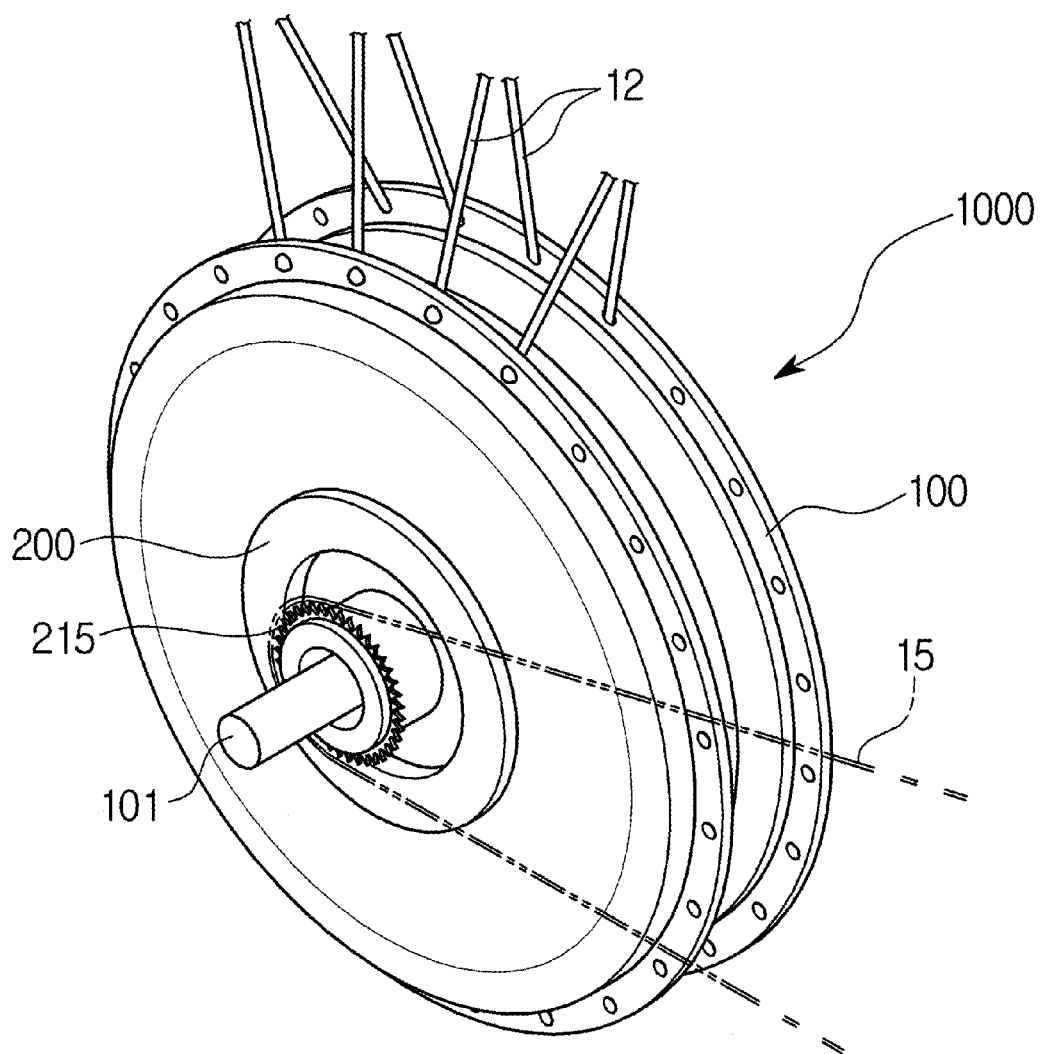
FIG. 1 is a perspective view illustrating a hub motor structure according to an embodiment of the present disclosure.

Reference will now be made in detail to the embodiments of the present disclosure, examples of which are illustrated in the accompanying drawings, wherein like reference numerals refer to like elements throughout.

Figure 2:
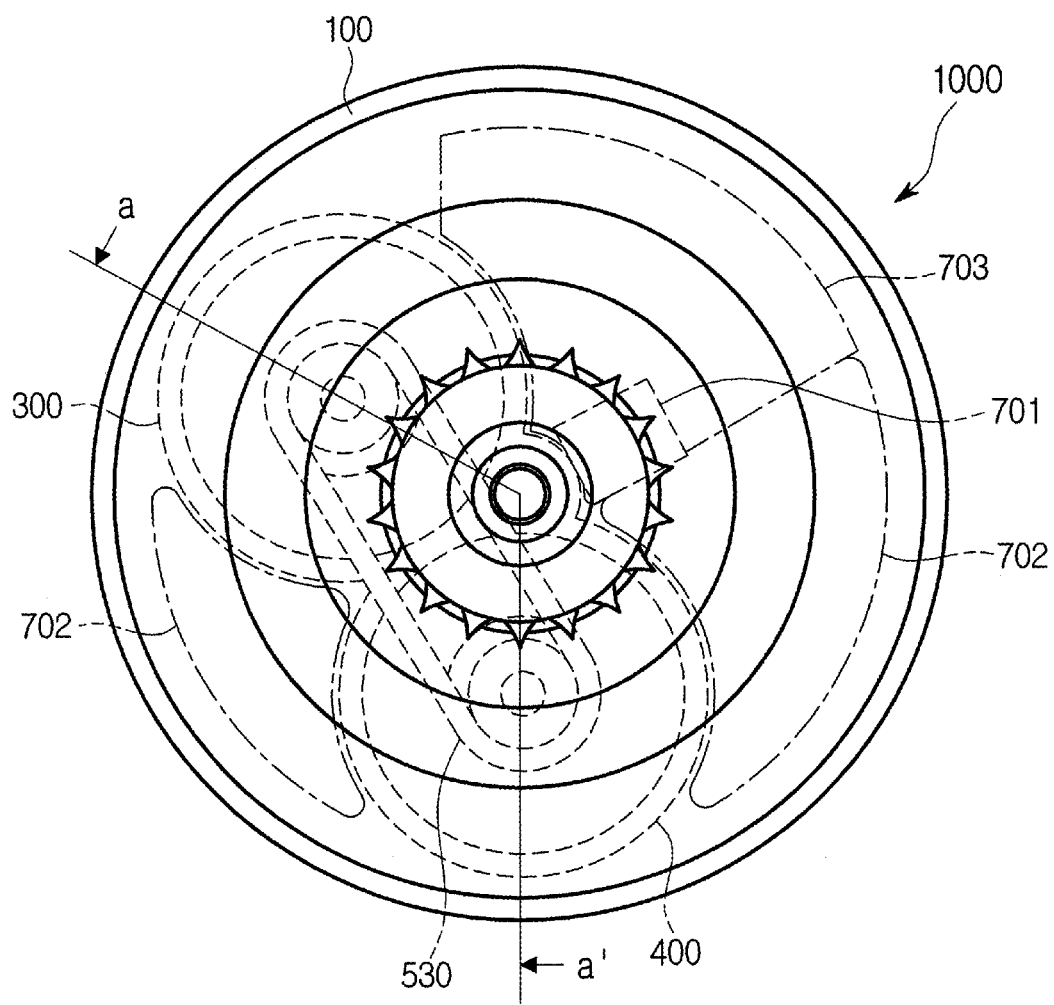
FIG. 2 is a plan view illustrating a hub motor structure according to an embodiment of the present disclosure.
Figure 3:
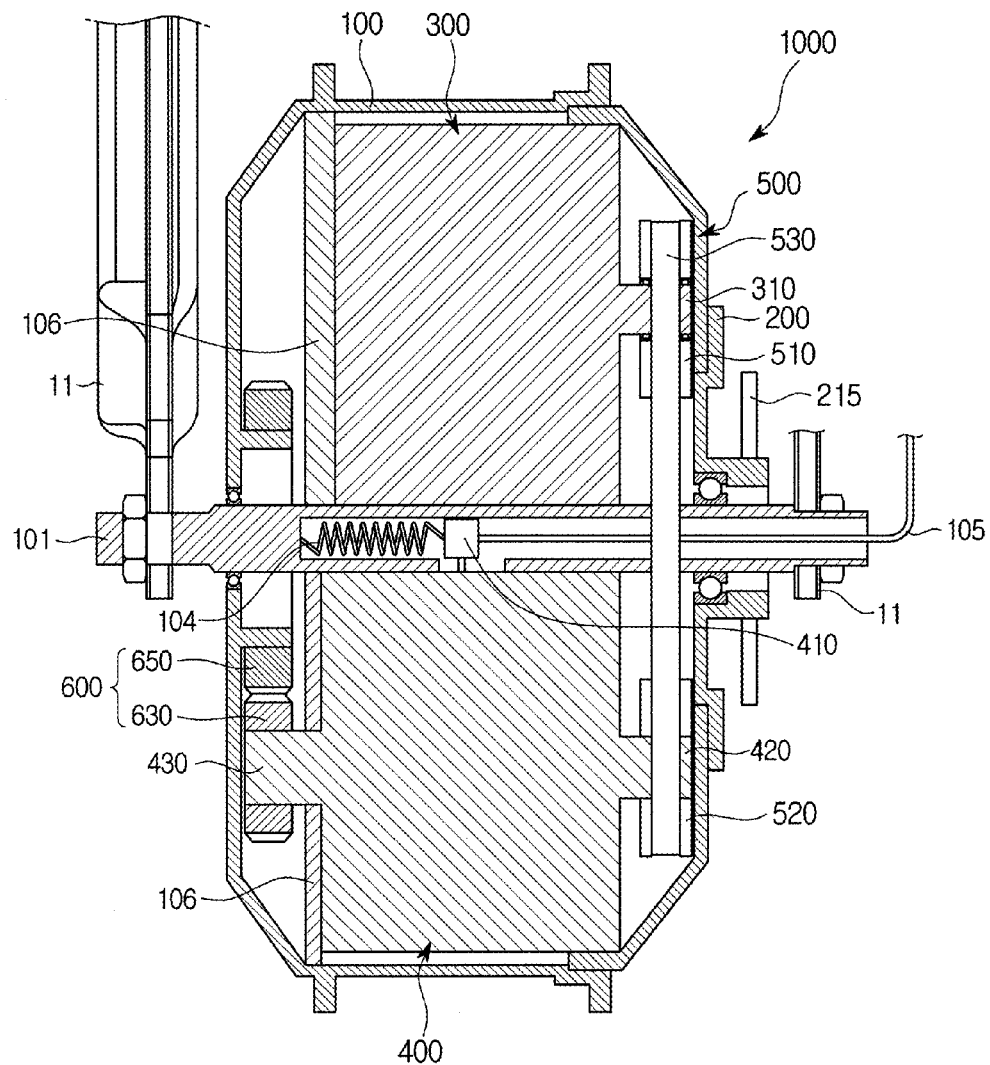
FIG. 3 is a cross section view taken along line a-a' of FIG. 2.

FIG. 1 is a perspective view illustrating a hub motor structure according to an embodiment of the present disclosure, FIG. 2 is a plan view illustrating a hub motor structure according to an embodiment of the present disclosure, and FIG. 3 is a cross section view taken along line a-a' of FIG. 2.

Referring to FIGS. 1 to 3, a hub motor structure 1000 according to an embodiment of the present application is installed on a hollow shaft 101 installed on a frame 11 of a bicycle. In more detail, the hub motor structure 1000 includes a housing 100 rotatably installed on the hollow shaft 101 of a wheel (a front wheel or a rear wheel (not shown)), a cover 200 installed on the housing 100, a motor 300 disposed in the housing 100 and generating a rotary force, a continuous variable transmission (CVT) 400 to selectively shift power supplied from the motor 300, a power transmission unit 500 configured to transmit a rotary force of the motor 300 to the CVT 400, a gear unit 600 configured to transmit a rotary force to the housing 100, and a torque sensor 701 installed on the hollow shaft 101 to sense a pedal torque. In this case, a battery 702 and an engine control unit (ECU) 703 that performs a battery management system (BMS) as well as electric connection and control are installed in a space of the housing 100 that is not taken by the motor 300 and the CVT 400. That is, as the battery 702 and the ECU 703 are disposed in the housing 100, a wiring structure for electric connection between the motor 300, the battery 702 and the ECU 703 is simplified and also the volume of the motor structure is reduced.

The housing 100 is provided with a predetermined interior space formed therein, and thus rotatably installed on the hollows shaft 101. That is, as shown in the drawings, the hollow shaft 101 passes through the center of the housing 100 and has both ends fixed to the frame 11 of the bicycle. Spokes 12 are installed on an outer circumferential surface of the housing 100 and connected to a wheel (not shown). In addition, the housing 100 accommodates a fixing panel 106 configured to fix the motor 300 and the CVT 400. The fixing panel 106 is fixedly installed on the hollow shaft 101.

The cover 20 is assembled to the housing 10 while rotatably installed on the hollow shaft 101. As shown in the drawings, the cover 200 is assembled to one side of the housing 100, and is provided at a center portion thereof with an opening penetrated by the hollow shaft 101. A driven sprocket 215 connected to a chain 15 is provided on the cover 200 to receive a pedaling force according to pedaling of the bicycle. That is, the cover 200 is provided to be rotated by receiving a pedaling force of a rider from the driven sprocket 215 connected to the chain 15.

In this case, the housing 100 is rotated together with the cover 200 while coupled to the cover 200. That is, the housing 100 and the cover 200 may be rotated by a pedaling force according to pedaling, or rotated together with the wheel by a rotary force generated from the motor 300.

The motor 300 is a generally known motor, and includes a rotor (not shown), a stator (not shown) and a rotating shaft 310 that rotates together with a rotor. As described above, the motor 300 is fixedly installed on the fixing panel 106. In this case, a driving gear 510 of the power transmission unit 500 that is to be described later is installed on the rotating shaft 310.

The CVT 400 is disposed in the housing 100, and serves to selectively shift power supplied from the motor 300. As shown in the drawings, the CVT 400 is fixedly installed on the fixing panel 106 together with the motor 300, and outputs a driving force to the housing 100 by receiving a rotary force from the motor 300 through the power transmission unit 500.

In detail, the CVT 400 includes a speed-changing lever 410 to adjust a gear ratio, an input shaft 420 to receive the rotary force of the motor 300, an output shaft 430 to output the transmitted rotary force to the outside and a speed-changing gear unit (not shown) installed between the input shaft 420 and the output shaft 430. The CVT 400 is a general CVT offered on the market, for example, a cone-type CVT manufactured by SHIMPO. The cone-type CVT has a cone-shaped gear installed on each of the input shaft 420 and the output shaft 430, and a speed-changing gear meshed between the cone-shaped gears and configured to adjust a gear ratio while moving by the speed-changing lever 410. Such a cone-type CVT is generally known in the art, and thus the detailed description thereof will be omitted.

Figure 4:
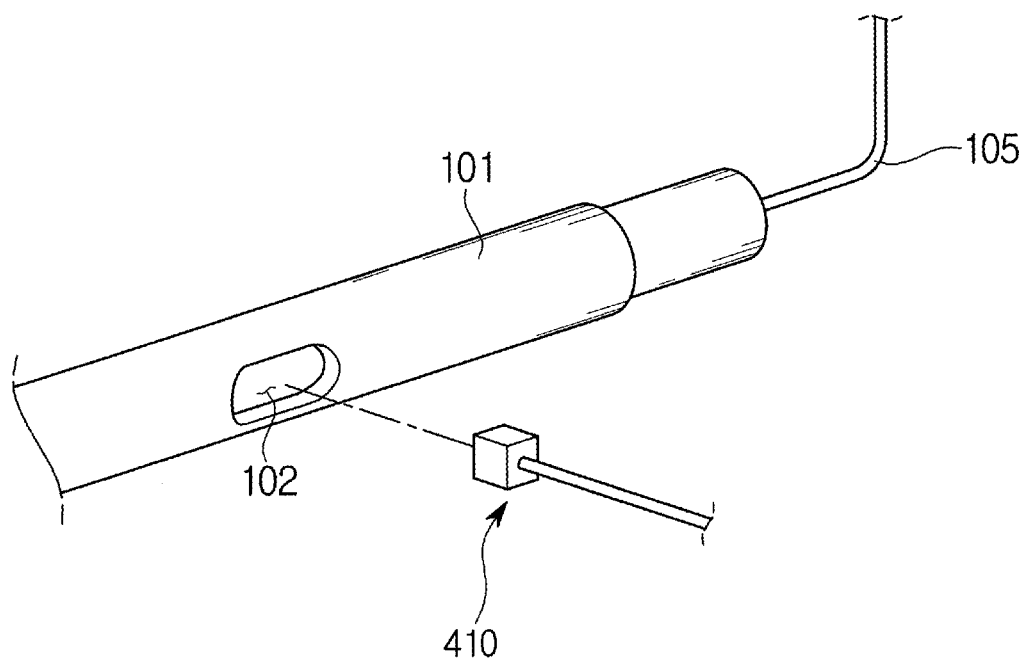
FIG. 4 is a perspective view illustrating a hollow shaft provided on a hub motor structure according to an embodiment of the present disclosure.

Meanwhile, the speed-changing lever 410 is inserted into an elongation hole (see '102' of FIG. 4) formed lengthwise along the hollow shaft 101, to be disposed in the hollow shaft 101 such that the speed-changing lever 410 is connected to an operating wire 105 moving the speed-changing lever 410. In addition, an elastic member 104 is provided inside the hollow shaft 101 to return the speed-changing lever 410 having been moved by the operating wire 105 into its original position. The elastic member 104 has one end fixed to the hollow shaft 101, and the other end fixed to the speed-changing lever 410 to provide the speed-changing lever 410 with an elastic force. That is, one end of the speed-changing lever 410 is connected to the operating wire 105, and the other end of the speed-changing lever 410 is connected to the elastic member 104. An elastic restoring force of the elastic member 104 is generated as the speed-changing lever 410 moves, and if a force applied to the operating wire 105 is canceled, the speed-changing lever 410 is returned to its original position by the elastic restoring force.

The power transmission unit 500 includes a driving gear 510 installed on the rotating shaft 310 of the motor 300, a driven gear 520 installed on the input shaft 420 of the CVT 400 which is disposed in parallel to the rotating shaft 310, and a timing belt 530 connecting the driving gear 510 to the driven gear 520. Accordingly, the rotary force of the driving gear 510 is transmitted to the driven gear 520 through the timing belt 530.

Meanwhile, an one-way clutch 511 may be installed on the rotating shaft 310 of the motor 300 to transmit the rotary force of the motor 300 in one direction. In more detail, the one-way clutch 511 is provided between the rotary shaft 310 and the driving gear 510. The one-way clutch 511 is a connecting element allowing for only one-way rotation, and if a direction in which the rotating shaft 310 rotates is identical to the rotation direction allowed by the one-way clutch 511, a rotation of the rotating shaft 310 is transmitted to the driving gear 510, so that the driven gear 520 and the input shaft 420 are rotated through the timing belt 530. Such an one-way clutch 511 allows the wheel (not shown) to be rotated by a rotary force generated at the driving of the motor 300, and when a rotary force of the wheel is greater than a rotary force of the motor 300, that is, when the wheel generates a rotary force greater than that of the rotary force transmitted from the motor 300, the one-way clutch 511 prevents the rotary force of the wheel from being reversely transmitted to the motor 300. Although the one-way clutch 511 is illustrated as being installed on the rotating shaft 310 of the motor 300, the present disclosure is not limited thereto. For example, the one-way clutch 511 may be installed on the input shaft 420 of the CVT 400 transmitting a rotary force of the motor 300.

The rotary force transmitted through the power transmission unit 500 is output through the output shaft 430 of the CVT 400. In addition, the rotary force transmitted through the output shaft 430 is transmitted to the housing 100 through the gear unit 600. Referring to FIG. 3, the gear unit 600 includes an output gear 630 installed on the output shaft 430, and a spur gear 650 rotated while meshed with the output gear 630. In this case, the spur gear 650 is installed on the housing 100 so that the housing 100 and the spur gear 650 are rotated together with each other. That is, as the rotary force is transmitted to the spur gear 650 through the output gear 650, the spur gear 650 and the housing 100 are rotated together with each other.

The hub motor structure 100 according to an embodiment of the present application may further include a torque sensor (see '701' of FIG. 2) installed on the hollow shaft 101 to sense a pedal torque according to pedaling. The torque sensor 701 is a generally known torque sensor, and may be implemented using various types of torque sensors, for example, a phase difference detection torque sensor, a magnetostriction torque sensor, and a strain gauge torque sensor.

In addition, the hub motor structure 100 according to an embodiment of the present application may be provided with a housing having a structure different from that described above. For example, referring to FIGS. 5 and 6, a housing 100' according to another embodiment of the present disclosure may include a first body 110' rotatably installed on a hollow shaft (not shown), a second body 120' rotatably installed on the hollow shaft while spaced apart from the first body 110' by a predetermined interval and on which a cover (not shown) is installed, a ring plate 130' interposed between the first body 110' and the second body 120' and supported at both side ends thereof by the first body 110' and the second body 120', respectively, and a fastening member coupled by passing through the first body 110' and the second body 120'. In this case, other components installed in the housing 100', for example, a motor and a CVT, have the same structures as those described in the above.

Figure 5:
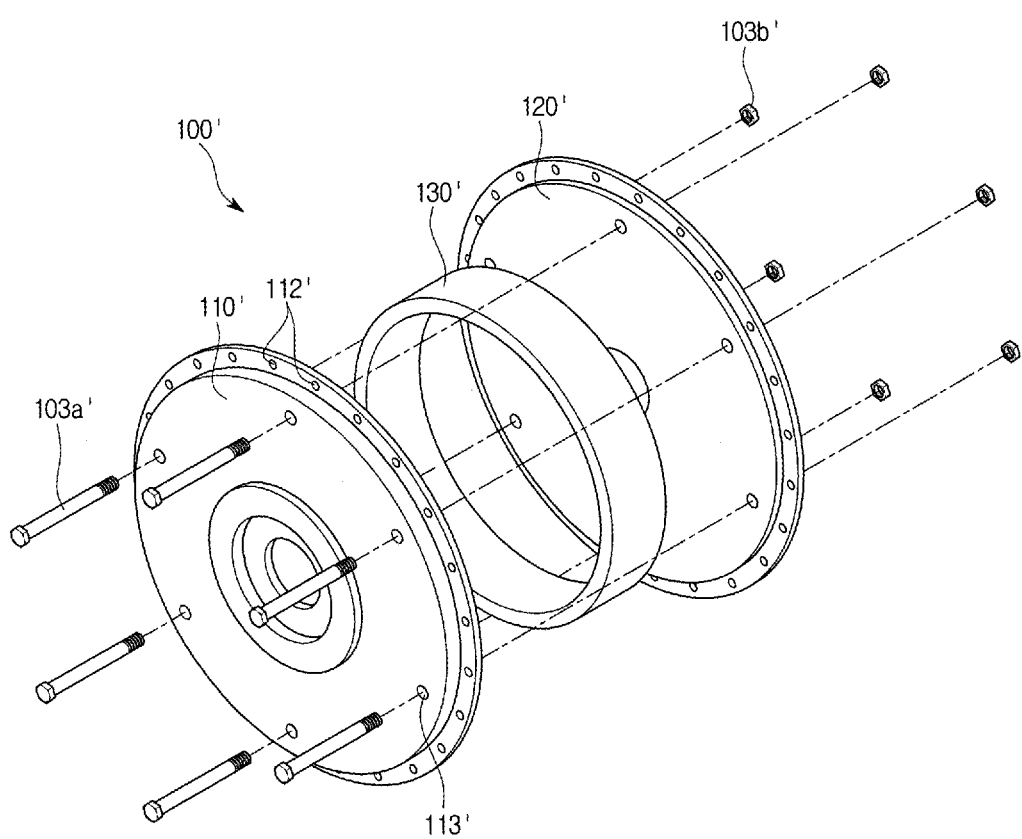
FIG. 5 is an exploded perspective view illustrating a hub motor structure according to another embodiment of the present disclosure.
Figure 6:
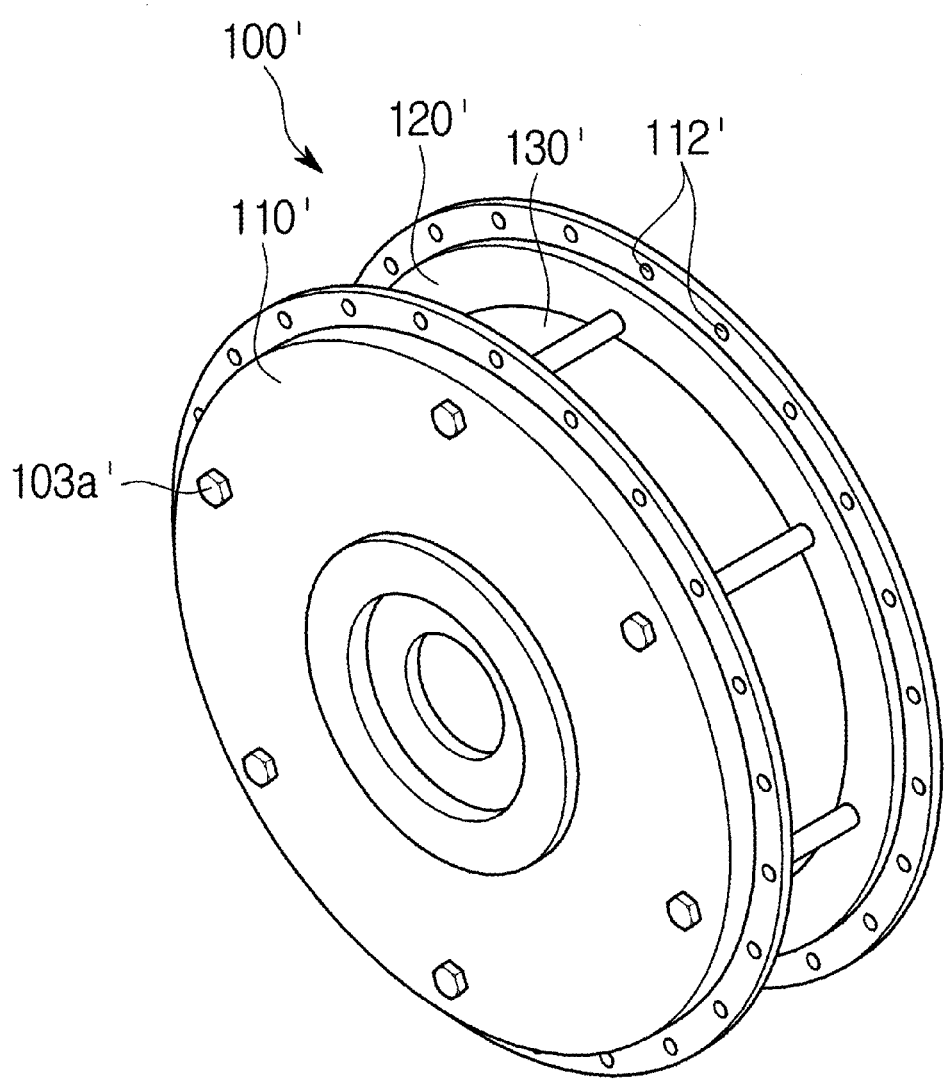
FIG. 6 is an assembled perspective view of FIG. 5.

Referring to FIGS. 5 and 6, spoke holes 112' for coupling with spokes and bolt installation holes 113' for coupling the first body 110' and the second body 120' are formed along a circumferential surface of each of the first body and the second body 110' and 120'. In this case, the fastening member includes a bolt 103a' and a nut 103b'. That is, the first body 110' is coupled to the second body 120' by the fastening member. The fastening member is fastened from outside of the ring plate 130' to support an outer circumferential surface of the ring plate 130'.

Meanwhile, the ring plate 130' may include plastic. Accordingly, the ring plate 130' including plastic is connected to an electronic control unit disposed in the housing 100' in a wireless communication scheme, for example, Bluetooth scheme.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A hub motor structure installed on a bicycle, the hub motor structure comprising:
    a hollow shaft installed on a frame of the bicycle;
    a housing rotatably installed on the hollow shaft, and connected to a wheel at an outer circumferential surface thereof through spokes;
    a cover rotatably installed on the hollow shaft while installed on the housing, and on which a driven sprocket connected to a chain is provided to receive a pedaling force;
    a motor disposed in the housing and generating a rotary force to drive the wheel;
    a continuous variable transmission (CVT) disposed in the housing to selectively shift power supplied from the motor;
    a power transmission unit configured to transmit a rotary force of the motor to the CVT; and
    a gear unit configured to transmit a rotary force output from the CVT to the housing.

2. The hub motor structure of claim 1, wherein:
    the CVT has a speed-changing lever to adjust a gear ratio; and
    the speed-changing lever is disposed in the hollow shaft while inserted into an elongation hole formed lengthwise along the hollow shaft so as to be movable in a lengthwise direction of the elongation hole.

3. The hub motor structure of claim 2, wherein the speed-changing lever has one end connected to an operating wire configured to move the speed-changing lever, and the other end connected to an elastic member providing the speed-changing lever with an elastic force.

4. The hub motor structure of claim 1, wherein the power transmission unit comprises:
    a driving gear installed on a rotating shaft of the motor;
    a driven gear installed on an input shaft of the CVT which is disposed in parallel to the rotating shaft; and
    a timing belt connecting the driving gear to the driven gear.

5. The hub motor structure of claim 4, wherein
an one-way clutch is installed between the rotating shaft of the motor and the driving gear to transfer the rotary force of the motor only in one direction.

6. The hub motor structure of claim 1, wherein the gear unit comprises:
an output gear installed on an output shaft of the CVT; and
a spur gear installed on the housing while meshed with the output gear,
wherein the housing is provided to be rotated together with the spur gear.

7. The hub motor structure of claim 1, wherein a fixing panel fixed to the hollow shaft is installed inside the housing, and the motor and the CVT are installed on the fixing panel.

8. The hub motor structure of claim 1, wherein the housing accommodates a battery pack electrically connected to the motor and an engine control unit (ECU) for electric connection and control with respect to the motor, the battery packet and electronic components.

9. The hub motor structure of claim 1, wherein a torque sensor is installed on the hollow shaft to sense a pedal torque.

10. The hub motor structure of claim 1, wherein the housing comprises:
a first body rotatably installed on the hollow shaft;
a second body rotatably installed on the hollow shaft while spaced apart from the first body by a predetermined interval, and allowing the cover to be installed thereon;
a ring plate interposed between the first body and the second body; and
a fastening member configured to couple the first body to the second body by passing through the first body and the second body.

11. The hub motor structure of claim 10, wherein the first body and the second body each have spoke holes allowing spokes to be radially coupled along the outer circumferential surface, and a bolt installation hole into which a bolt of the fastening member is inserted.

12. The hub motor structure of claim 10, wherein the ring plate includes plastic.

* * * * *